United States Patent [19]

Ogawa et al.

[11] 3,896,459
[45] July 22, 1975

[54] CONTROL CIRCUIT FOR AN AUTOMATIC PHOTOGRAPHIC CAMERA

[75] Inventors: Francis T. Ogawa, Lakewood; John D. Wallace, Denver, both of Colo.

[73] Assignee: Honeywell Inc., Minneapolis, Minn.

[22] Filed: May 29, 1974

[21] Appl. No.: 474,353

[52] U.S. Cl. ............... 354/31; 354/34; 354/50; 354/145; 354/147
[51] Int. Cl. ................ G03b 15/05; G03b 7/08
[58] Field of Search ........... 354/31, 32, 33, 34, 173, 354/204, 206, 133, 50, 51, 137–139, 145, 147, 149

[56] References Cited
UNITED STATES PATENTS

| | | |
|---|---|---|
| 3,142,238 | 7/1964 | Hofmann et al. ............... 354/173 |
| 3,568,584 | 3/1971 | Harvey ............................ 354/204 X |
| 3,638,545 | 2/1972 | Kobayashi et al. ............... 354/34 |
| 3,683,766 | 8/1972 | Nobusawa ....................... 354/31 X |
| 3,699,861 | 10/1972 | Burgarella et al. .............. 354/133 |
| 3,792,484 | 2/1974 | Tsujimoto et al. ............... 354/31 |
| 3,820,128 | 6/1974 | Burgarella et al. .......... 354/149 X |

*Primary Examiner*—Samuel S. Matthews
*Assistant Examiner*—James A. LaBarre
*Attorney, Agent, or Firm*—Arthur H. Swanson; Lockwood D. Burton

[57] ABSTRACT

An automatic photographic camera which features automatic exposure control, automatic flash operation and automatic film advance and shutter cocking, includes an electronic control circuit featuring a logic circuit which is responsive to a number of parametric signals to effect a control of the timing and actuation of the several automatic functions of the camera.

5 Claims, 3 Drawing Figures

CONTROL CIRCUIT FOR AN AUTOMATIC PHOTOGRAPHIC CAMERA

CROSS REFERENCE TO RELATED APPLICATIONS

Subject matter disclosed but not claimed herein is shown and claimed in a copending application of Dean M. Peterson for Photographic Apparatus filed on Mar. 22, 1974, Ser. No. 453,888, or in an application of Francis T. Ogawa for control circuits Ser. No. 374,691, filed on June 28, 1973.

BACKGROUND OF THE INVENTION

Field of the Invention

The present invention relates to photographic apparatus. More particularly it relates to automatic control circuitry for an automatic camera of the type which may be classified in Class 95, Sub-classes 10, 11, 31, 44, 53 or 64; Class 250, Sub-class 201; or Class 352, Sub-classes 140 and 141.

Description of the Prior Art

Heretofore many structures have been devised or providing what are called automatic camera operations. Some of these have included automatic exposure control systems which feature control either of the time of exposure or the iris opening of the camera, or both. Other camera have provided means for indicating that an insufficient ambient light was available for a proper exposure of the film. Such means, however, were merely indicators and did not effect a control function within the camera. Some cameras included a built in electronic flash unit. These, however, required a selection by the operator of the camera, prior to the taking of the picture to effect an operation of the flash unit.

SUMMARY OF THE INVENTION

In the above referenced copending application of Dean M. Peterson, a fully automatic camera is provided which features means for effecting an automatic control of exposure of the film in the camera to a predetermined amount of light (the control being effected by controlling both the aperture and a shutter opening time). That camera also includes a built in electronic flash unit which is automatically operative whenever insufficient ambient light is available to effect a proper exposure of the film in the camera. The referenced camera further includes structure for automatically advancing the film in the camera to a first film frame position upon loading the camera with a film cartridge, then advancing the film automatically to subsequent film frame positions automatically upon the completion of a picture taking cycle.

The above referenced Ogawa application shows an electronic control circuit suitable for use in a camera of the type set forth in the referenced Peterson application. The circuit there shown is a relatively sophisticated circuit.

It is an object of the present invention to provide an improved electronic control circuit for an automatic camera.

It is another object of the present invention to provide an improved electronic control circuit for controlling, timing and coordinating the operation of a number of automatic features of an automatic camera.

It is yet another object of the present invention to provide an automatic control circuit for an automatic camera which circuit features simplified logic control circuitry.

In accomplishing these and other objects, there has been provided, in accordance with the present invention, a control circuit for an automatic photographic camera which features a logic control system connected to respond to each of several input parameters developed by appropriate sensors built into the camera for programming and controlling the sequence of a plurality of automatic operations within the camera. For example, when a film cartridge is loaded into the camera and a compartment door of the film cartridge chamber is closed, the film in the cartridge is automatically advanced to the first film frame position by the energization of an electric motor. An electronic flash unit is built into the camera and includes suitable charging and triggering circuits for the electronic flash unit. A first light sensor is positioned to respond to ambient light conditions. If sufficient ambient light exists to take a photograph without the use of auxiliary light, such as the built in electronic flash unit, the first light sensor controls circuitry to block the operation of the charging circuit for the built in electronic flash unit. On the other hand, if the ambient light is low, the built in electronic flash unit is charged simultaneously with the operation of the film advance motor. During that interval, the photographer may aim the camera at the desired object to the photographed and effect a focussing of the camera lens on that object. When the photographer actuates the shutter release mechanism to initiate the picture taking process, the shutter of the camera is allowed to begin to open to admit light into the film chamber of the camera. A second light sensing means is positioned for sensing the amount of light so admitted through the shutter opening and to provide a control signal corresponding thereto. That control signal is indicative that sufficient light has been admitted through the opening of the shutter to properly expose the film in the camera. The logic circuit is responsive to that control signal to thereupon effect a closure of the shutter. Following the completion of the closure of the shutter, the motor is automatically actuated to advance the film of the camera to the next film frame position and, at the same time, to reset the shutter mechanism in readiness for a subsequent picture. If the first light sensor has sensed that insufficient ambient light exists for a proper exposure of the film in the camera, the logic circuits is enabled to provide a triggering signal for the electronic flash whereby to effect an actuation of the electronic flash at a proper time during the shutter opening phase of the camera operation.

BRIEF DESCRIPTION OF THE DRAWINGS

A better understanding of the present invention may be had from the following detailed description when read in connection with the accompanying drawings, in which.

DETAILED DESCRIPTION OF A PREFERRED EMBODIMENT

Figure 1:
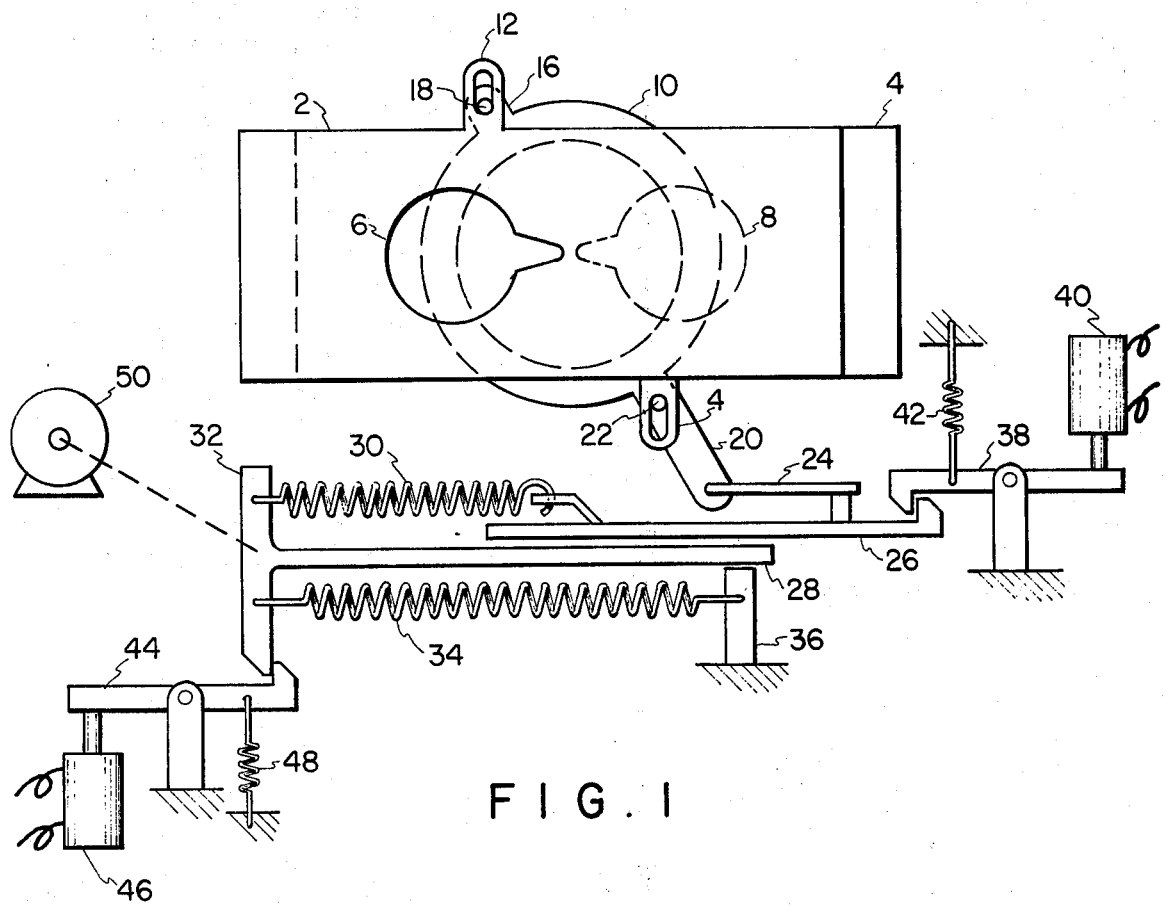
FIG. 1 is a schematic representation of a shutter mechanism for a camera suitable for use in connection with the present invention.

In FIG. 1 there is illustrated a shutter mechanism basically of the same type of that shown in the aforementioned copending Peterson application. The shutter comprises a first shutter blade 2 and a second shutter blade 4. The two shutter blades are constrained to simultaneous, oppositely directed, translational motion. Each of the shutter blades has a configured opening 6 and 8, respectively, comprised essentially of a circular opening having a substantially triangular radial extension protruding therefrom. In the shutter closed position, as shown in FIG. 1, it may be seen that the two openings are completely out of alignment with each other, blocking the admittance of light into the camera chamber. A complementary driving member 10 in the form of an annulus, or ring, is coupled to the two shutter blades 2 and 4, respectively. The shutter blade 2 includes a tab 12 extending from the edge thereof. A similar tab 14 extends from the lower edge of blade 4. The ring 10 has a radial tab 16 which carries a driving pin 18. The pin 18 extends through a slot in the tab 12 to couple the driving ring 10 to the first blade 2. Diametrically opposite from the radial tab 16 is a tang 20 extending from the periphery of the ring 10. The tang 20 carries a pin 22 which, in turn, extends through a slot in the tab 14 of the blade 4 to couple the blade 4 to the ring 10. At the other extremity of the tang 20, there is coupled a driving link 24. The driving link 24 is carried by a first driving plate 26 of a shutter driving mechanism. Also included in the shutter driving mechanism is a second driving plate 28. A first spring 30 is coupled between the first driving plate 26 and a shoulder or boss 32 of the second driving plate 28. A second spring 34 is connected between the boss 32 on the second driving plate 28 and a fixed reference point 36. The spring 30 is arranged to bias the first driving plate 26 toward the left, as shown in the illustrated embodiment. A latch member 38 engages the driving plate 26 to restrain it against the urging of the spring 30. In the structure illustrated in FIG. 1, the latch 38 is kept in engagement with the plate 26 by the energization of a magnet 40. De-energization of the magnet 40 allows the latch 38 to be disengaged from the plate 26 by the force of a spring 42. Similarly, the second driving plate 28 is restrained against the urging of the spring 34 by a latch 44. The latch 44 is held in engagement with the plate 28 by the energization of a magnet 46. De-energization of the magnet 46 allows the latch 44 to be disengaged from the plate 28 by operation of the force of a spring 48.

In the process of operating the camera, when the latch 38 is released by the de-energization of the magnet 40, the drive plate 26 begins to move, under the urging of the spring 30, toward the left, as shown in the illustrative embodiment. Since the ring 10 is constrained to move in a rotational direction about a virtual axis concentric with the optical axis of the camera, the movement of the drive plate 26 causes the ring 10 to be rotated in a clockwise direction about its axis. The movement of the ring, in turn, causes the two shutter blades to be moved in oppositely directed translational motion such that the openings in the two shutter blades move toward each other in an overlapping relationship to produce a progressively larger aperture window through which light is admitted to the chamber of the camera. When sufficient light has been admitted for a proper exposure of the film in the camera, as will be hereinafter shown, the magnet 46 is de-energized, releasing the second driving plate 28 to be moved to the right under the urging of the spring 34. As the plate 28 is moved to the right, it carries the first plate 26 with it to return that plate to its original position as shown in FIG. 1. The returning coupling between the plate 28 and the plate 26 may be a simple abutment such as a shoulder, or boss, 32 which would then engage the end of the plate 26 on the release of the latch 44. Returning the plate 26 to its original position restores the shutter blades to their closed position as shown in FIG. 1. An electric motor 50 is provided which, upon energization, is operative to restore the second driving plate 28 to its original position, the position shown in FIG. 1. When the motor 50 is operative to restore the second driving plate 28 to its original position, it is also further operative, through a coupling (not here shown), to advance a film in the camera to the next frame position.

The mechanism thus far described and illustrated in FIG. 1, as well as the mechanism illustrated in FIG. 2 and to be hereinafter described, is schematic in presentation for the purpose of illustrating the environment for the electronic control circuit constituting the present invention.

Figure 2:
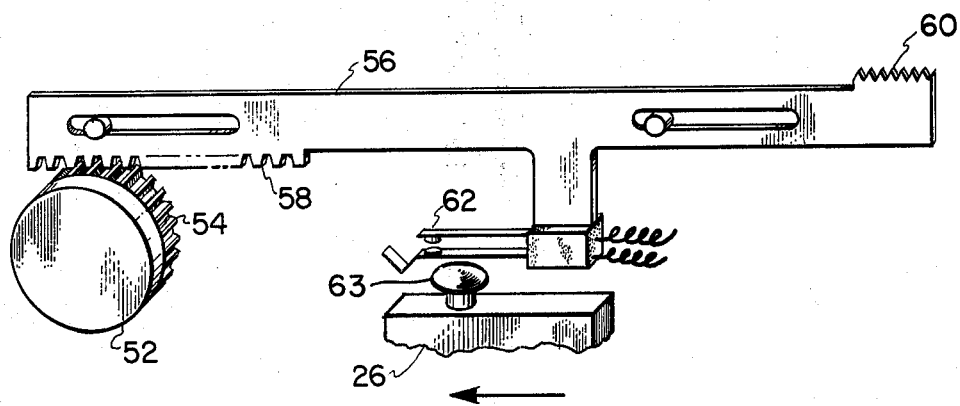
FIG. 2 is a schematic representation of the adjustable lens system for a camera embodying the present invention.

In FIG. 2 there is shown a schematic representation of a lens barrel 52 of a type which may be used in the camera embodying the present invention. The outer periphery of the lens barrel is provided with a series of gear-tooth type serrations 54. A slide plate 56 is arranged to be moved transversely of the axis of the lens barrel 52. At a portion of the slide plate 56 adjacent the lens barrel 52 there is formed a rack of gear teeth 58 which is arranged to engage the serrations 54 on the lens barrel 52. The slide plate 56 may be caused to move transversely of the lens barrel manually by engaging a knurled member 60 by the finger of the operator. As the slide plate 56 is thus moved transversely of the lens barrel, the teeth of the rack 58 in engagement with the teeth of the serrations 54 on the lens barrel 52 cause the lens barrel 52 to be rotated about its optical axis, and, in a known manner, effect a focussing of an image of the object to be photographed on a film plane within the camera.

The slide plate 56 also carries a normally opened switch 62. It will be noted that the contacts of the switch 62 change their position as the position of the slide plate, itself, is changed. That is, the position of the switch contacts changes in accordance with the focus adjustment of the camera. Means associated with the shutter driving mechanism are provided for actuating, or closing, the contact of the switch 62 as the shutter blades are moved towards their open position. This relationship is schematically represented in FIG. 2 as a switch actuator or boss 63 mounted on and carried by the first driving plate 26 (shown in fragmentary form). Again, the structure shown in FIG. 2 is illustrative of the environment to which the circuit of the present invention pertains.

Figure 3:
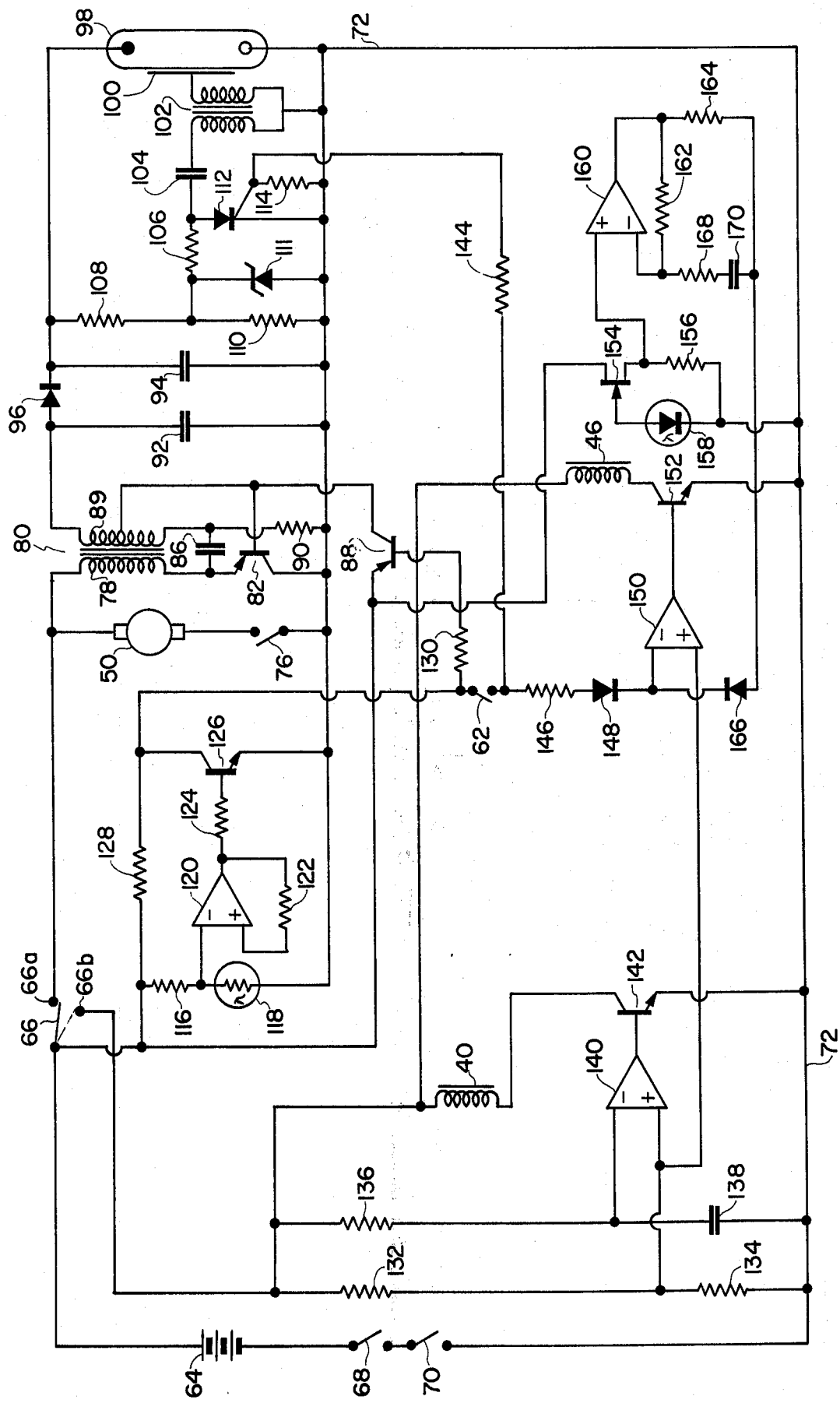
FIG. 3 is a schematic diagram of an electronic control system embody the present invention.

The circuit comprising the present invention is shown schematically in FIG. 3. That circuit includes a power source represented by a battery 64. The positive terminal of the battery 64 is connected to the movable contact of a first switch 66. The switch has a first fixed contact 66a and a second fixed contact 66b. The negative terminal of the battery 64 is connected through a serial arrangement of a first and second line switch 68 and 70, respectively, to a common return bus 72. The switch 68 constitutes a primary "on-off" switch and is preferably interlocked with a portion of the camera which is positionally adjusted between a stored condition and a ready condition. An example of such a portion of the camera to which the switch 68 may be interlocked is a collapsible or retractable view finder. The switch 70, on the other hand, is preferably interlocked with a cover door through which a film cartridge is loaded into the camera. The interlock switch 70 would be opened anytime the film door is opened, to prevent inadvertent operation of the camera whenever a film cartridge is being changed.

The contact 66a of the switch 66 is connected to one input terminal of the electric motor 50. The other terminal of the motor 50 is connected through a switch 76 to the common return bus 72. The switch 76, as will be discussed in more detail hereinafter, is connected to a sensor associated with the film advanced mechanism. The terminal 66a is also connected to the primary winding 78 of a transformer 80, through the emitter-collector path of a transistor 82, to the common return bus 72.

The transformer 80 includes a secondary winding 89. A capacitor 86 is coupled between one end of each of the two windings of the transformer 80. The secondary winding 89 is center tapped and provides the connection to the base electrode of the transistor 82 and to the collector electrode of a transistor 88. The end of the transformer secondary winding 84 to which the capacitor 86 is connected is also connected through a resistor 90 to the common return bus 72. A capacitor 92 is connected between the remote end or free end of the secondary winding 84 and the common return bus 72. The transformer and the associated circuitry comprise an oscillator capable of producing a high voltage charge on a main storage capacitor 94. The capacitor 94 is connected through a rectifying diode 96 to the aforementioned end free end of the transformer secondary winding 84; with the other terminal of the capacitor 94 being connected to the common return bus 72. An electronic flash tube 98 has its electrode terminals connected across the capacitor 94. A trigger electrode 100 of the flash tube 98 is connected to a flash initiating or trigger circuit. The trigger circuit includes a transformer 102 having a grounded center tap and with a secondary winding connected directly to the trigger electrode 100; the primary winding is connected to one terminal of a trigger capacitor 104. The other terminal of the capacitor 104 is connected through a serial resistor 106 to the junction between a pair of voltage dividing resistors 108 and 110. The resistors 108 and 110 are serially connected across the capacitor 94. A zener diode 111 is connected in parallel with the resistor 110 to establish a predetermined voltage reference level at the junction between the resistor 110 and 108. The junction between the resistor 106 and the capacitor 104 is connected to the anode of a silicon control rectifier 112 the cathode of which is connected to the common return bus 72. The gate electrode of the silicon control rectifier 112 is connected through a resistor 114 to the common return bus 72, thereby normally biasing the silicon control rectifier to an non-conducting state.

A first light responsive circuit includes a resistor 116 and a photo-resistor 118 serially connected between the positive terminal of the battery 64 and the common return lead 72. The inverting input terminal of an amplifier 120 is connected to the junction between the resistor 116 and the photo-resistor 118. It is contemplated that the photo-resistor 118 will be positioned to be exposed to ambient light. Hence, the first light responsive circuit will be responsive to ambient light conditions. The output terminal of the amplifier 120 is connected through a feedback resistor 122 to the other input terminal of the amplifier 120. The output terminal of the amplifier 120 is also connected through a resistor 124 to the base electrode of a transistor 126. The collector electrode of the transistor 126 is connected through a resistor 128 to the positive terminal of the battery 64. The emitter electrode of the transistor 126 is connected directly to the common return bus 72. The collector electrode of the transistor 126 is also connected through a resistor 130 to the base electrode of the transistor 88. The collector of the transistor 126 is also connected to one of the contacts of the switch 62. It will be remembered that the switch 62 is a switch actuated by the shutter mechanism and comprises a flash synchronizing switch. The emitter of the transistor 88 is also connected directly to the positive terminal of the battery 64.

The normally open contact 66b of the initiating switch 66 is contacted through a first resistor 132 and a second resistor 134, in series, to the common return bus 72. Connected in parallel with the serially connected resistors 132 and 134 is a serially connected resistor 136 and a capacitor 138. The junction between the resistor 136 and the capacitor 138 is connected to the inverting input terminal of an amplifier 140. The junction between the resistors 132 and 134 is connected to the other input terminal of the amplifier 140. The output terminal of the amplifier 140 is connected to the base electrode of a transistor 142. The emitter of the transistor 142 is connected directly to the common return bus 72, while the collector electrode is connected through the winding of the electrode magnet 40 to the contact 66b of the switch 66.

The normally opened contact of the switch 62 is connected, first, through a resistor 144 to the gate electrode of the silicon control rectifier 112 in the trigger circuit for the flash tube 98. The normally opened contact of the switch 62 is also connected through a resistor 146 and a diode 148 to the inverting input terminal of an amplifier 150 in a second light responsive circuit. The other input terminal of the amplifier 150 is connected to the junction between the resistors 132 and 134. The output terminal of the amplifier 150 is connected to the base electrode of a transistor 152 the emitter electrode of which is connected to the common return bus 72. The collector of the transistor 152 is connected through the winding of the electromagnet 46 to the contact 66b of the switch 66. It will be remembered that the electromagnet 40 and 46 are the magnets that control the actuation of the shutter drive mechanism.

The positive terminal of the battery 64 is connected to the source electrode of a filed effect transistor (FET) 154 the drain electrode of which is connected through a resistor 156 to the common return bus 72. A light sensitive or photodiode 158 has its anode connected to the gate electrode of the FET 154 and its cathode connected directly to the common return bus 72. It is contemplated that the photo-diode 158 will be positioned within the camera body to be exposed only to the influence of light admitted through the lens assembly by the shutter blades when the shutter is open. Hence, the second light responsive circuit will be responsive only to light admitted by the shutter mechanism and to which the film in the camera will be exposed. The drain electrode of the FET 154 is connected to the non-inverting input terminal of an amplifier 160. The output terminal of the amplifier 160 is connected through a feeback resistor 162 to the inverting input terminal of the amplifier 160. The output terminal of the amplifier 160 is also coupled through a resistor 164 and a diode 166 to the inverting input terminal of the amplifier 150. A resistor 168 and a capacitor 170, in series, are connected between the inverting input terminal of the amplifier 160 and the junction between the resistors 164 and the diode 166.

MODE OF OPERATION OF THE EMBODIMENT

Initially, a camera has no film cartridge in the chamber and the interlock switch 68 is open due, for example, to the view finder being in its stowed or inoperative position. With the switch 68 open, no power from the battery 64 is applied to any part of the circuit.

To prepare the camera for operation, the door to the film cartridge chamber must be opened and the view finder extended to its operative position. Under these conditions the switch 68 will be closed but the switch 70, interlocked with the film cartridge chamber door will be open. As such, no power from the battery 64 will yet be applied to the circuit.

When the film cartridge has been inserted in the chamber and the door to that chamber closed, the switch 70 will be closed applying energy from the battery 64 to the circuit through the switch 66 and its normally closed contact 66a. With the insertion of film in the camera, the switch 76 in the circuit of the motor 50 will be closed. As previously mentioned, the switch 76 is coupled to a sensor which engages the surface of the film in the camera. Film provided in such film cartridges is customarily provided with spaced perforations indicative of the first and successive film frame positions relative to the optical axis of the associated camera. The switch 76 is normally biased into an open condition and is held in a closed position by the presence of an unperforated part of the film. Thus when a new film cartridgee is inserted in the cartridge chamber and the chamber door is closed the motor 50 will be energized by the closure of the switch and will remain closed until the film has been advanced to the first film frame position. At such first film frame position, the sensor will detect the first perforation and thereby open the switch 76, de-energizing the motor. When the motor 50 was energized, in addition to advancing the film, suitable mechanism was activated to reset to cock the shutter drive mechanism.

Simultaneously with the energization of the motor 50, energizing power was also supplied from the battery 64 to the ambient light detecting circuit including the photo detector 118, the amplifier 120, and the transistor 126. At the same time, energy from the battery 64 is applied to one terminal of the primary winding 78 of the transformer 80; the other terminal of the primary winding being connected through the emitter collector path of the transistor 82 to the common return bus 72. If the ambient light level is high enough to permit the taking of a picture without the use of auxiliary light, that light level being established as a threshold signal at the input of the amplifier 120, the output signal of the amplifier 120 will be such as to render the transistor 126 conductive. When the transistor 126 is rendered conductive the transistor 88 is also rendered conductive. The conduction of the transistor 188, however, causes the transistor 82 to be nonconductive. With the transistor 82 nonconductive, the transformer 80 and its associated circuitry is blocked from oscillation. Under those conditions, the capacitor 94, the main storage capacitor for the electronic flash unit, is not changed to operating potential. On the other hand, if the ambient light level is below that required for a photograph, the threshold established at the output of the amplifier 120 as compared with the input signal to the amplifier 120, as detected by the photo detector 118, is such that the transistor 126 is rendered nonconductive, turning off the transistor 88 and allowing the transistor 82 to become conductive. When the transistor 82 is conductive the circuit associated with the transformer 80 and the capacitor 92 is allowed to oscillate and, thereby, to establish an operating charge on the main storage capacitor 94 of the flash unit.

The operation described thus far, the advancement of the film to the first frame position, the resetting of the shutter drive mechanism and the charging if necessary of the electronic flash unit, all transpires while the switch 66 is closed on the normally closed contact 66a. This places the camera in readiness for a picture taking sequence.

To initate a picture taking sequence, the usual shutter release button on the camera is depressed. As in the usual case with cameras, mechanical latch means normally hold the shutter mechanism in a set or cocked condition until the shutter release button is depressed. In the present case, in addition to the usual mechanical latches, there are electrically controlled latch means for holding the shutter drive mechanism in its cocked condition. Activation of the shutter release button also activates the switch 66 which is interlocked therewith. Therefore, as the shutter release button is depressed, the movable contact of the switch 66 is transferred to engagement with the normally opened contact 66b. Such movement of the switch 66 applies energy from the battery 64 to the latch circuit for the electromagnet 40, involving the amplifier 140 and the transistor 142. Simultaneously energy from the battery 64 is also applied to the latch circuit for the electromagnet 46, involving the amplifier 150 and the transistor 152. In the meantime, energy continues to be applied from the battery 64 to the second light sensing circuit involving the FET 154 and the photo diode 158.

As soon as the switch 66 is closed on the switch contact 66b, the amplifier 140 produces a positive or high level output signal, rendering the transistor 142 conductive, thereby energizing the electromagnet 40. The energization of the electromagnet 40 holds the shutter drive mechanism in its cocked condition until such time as the charge built up across the capacitor 138 has reached the reference level of the input to the amplifier 140. At that time, the output of the amplifier becomes negative, turning off the transistor 142 and releasing the electromagnet 40. This brief integration of the signal at the input of the amplifier 140 introduces a momentary delay in the actuation of the shutter mechanism, allowing the application of energy to the light measuring circuit to stablize before beginning the measuring operation. Such delay avoids the probability of the light measuring circuit inadvertently responding to noise signals incident to the application of energy thereto following the closure of the switch 66 on the contact 66b.

With the application of energy to the circuits involving the second electromagnet 46, the amplifier 150 produces a positive or high level output signal rendering the transistor 152 conductive, thereby energizing the electromagnet 46. The energization of the electromagnet 46 maintains the associated latch in engagement with the shutter drive mechanism to prevent the closure of the shutter until such time as the electromagnet 46 has been released. Under initial conditions, that is, with the shutter still closed, the absence of light falling on the photodiode 158 renders the FET 154 nonconductive. The nonconduction of the FET 154 produces a relatively low input signal to the input of the amplifier 160 producing a corresponding relatively low output signal.

At the end of the relatively brief delay in the operation of the electromagnet 40, that electromagnet 40 is de-energized allowing the associated latch to be released, thereby allowing the shutter mechanism to begin to move in the opening direction. As the shutter begins to open, the electromagnet 46 remains energized, preventing the actuation of the shutter closing mechanism until such time as a proper exposure has been accomplished.

Assume, first, that a low ambient light situation prevails wherein insufficient ambient light is presented for the taking of a proper photograph without the aid of auxiliary light. As previously mentioned the ambient light sensor circuit including the photosensitive element 118 detects the low ambient light condition and renders the transistor 126 nonconductive. The nonconductivity of the transistor 126 allows the oscillator associated with the electronic flash unit to oscillate, thereby charging the capacitor 94 to an operating level. The charge on the capacitor 94 places the flash tube 98 in condition to be ignited upon the reception of a proper trigger signal. The nonconduction of the transistor 126 places a high level signal at the movable contact of the switch 62. It will be recalled that the switch 62 is operated by the movement of the shutter opening mechanism at a time determined by the focus adjustment of the lens assembly of the camera. As the shutter mechanism moves in the opening direction, at the appropriate time, the switch 62 is closed, placing a high level signal at the trigger electrode of the SCR 112. That positive signal on the trigger electrode of the SCR 112 causes that element to become conductive, producing a pulse signal across the transformer 102 and on to the trigger electrode 100 of the flash tube 98. The pulse of energy on the electrode 100 of the flash tube 98 causes that flash tube to produce a flash of light in the well known manner.

When the switch 62 was closed, the same high level signal was also applied to the input terminal of the amplifier 150 causing that amplifier to change its output signal to a low level signal, thereby turning off the transistor 152, deactivating the electromagnet 46. Deactivation of the electromagnet 46 allows the associated latch to be disengaged from the shutter closing mechanism, whereupon the shutter mechanism closes, terminating the exposure of the film in the camera.

Now let it be assumed that a high ambient light level prevails at the time of the initiating of the picture taking procedure. The high level ambient light will be sensed by the light detector 118, causing the amplifier 120 to produce a relatively high output signal, thereby causing the transistor 126 to be conductive. With the transistor 126 conductive, a relatively low level signal is applied to the switch 62. Again, when the switch 62 is closed the low level signal is applied through the resistor 144 to the trigger electrode of the SCR 112. The low level signal applied to the trigger electrode SCR 112 does not cause the SCR to become conductive. Therefore, whether the capacitor 94 had been charged or not, there will be no flash produced by the flash tube 98 in the absence of the trigger signal from the SCR 112. The same low level signal at the switch 62 is applied, on closing of the switch 62, to the input of the amplifier 150 producing no change in the output signal thereof. Consequently, the electromagnet 46 remains activated preventing the initiation of operation of the shutter closing mechanism. As the shutter begins to open, light passing therethrough, in addition to exposing the film in the camera also illuminates the photodiode 158. The characteristic of the photodiode 168 is that it exhibits a natural tendency to integrate the effect of light falling thereon. Consequently, as the shutter continues to open, the light falling on the photodiode 158 causes the output signal of that photodiode to ramp upward, producing an effective positive ramp in the output signal from the FET 154. That output signal from the FET 154 is applied as input signal to the amplifier 160. As the input signal of the amplifier 160 ramps upward through a predetermined threshold level, the output signal from the amplifier 160 changes state to a high level signal. That output signal from the amplifier 160 is applied, through the diode 166, to the inverting input terminal of the amplifier 150. The signal thus applied to the input of the amplifier 150 exceeds the reference level applied to the other input terminal of the amplifier 150; the output of the amplifier 150 therefore changes state causing the transistor 152 to become nonconductive, de-energizing the electromagnet 46. De-energization of the electromagnet 46 allows the associated latch to be disengaged thereby initiating the closure of the shutter mechanism.

It is contemplated that the movement of the shutter closing mechanism as it approaches its terminal position will engage and momentarily close the switch 76. In the meantime, the switch 66 will have returned to its initial condition. Thus the closure of the switch 76 causes energization of the motor 50 which, in turn, advances the film to the next film frame position and simultaneously recocks the shutter mechanism. The camera will then be in readiness for the initiation of a subsequent picture taking sequence.

Thus there has been provided, in accordance with the present invention, an improved electronic control circuit for an automatic camera, for controlling the timing and coordination of the operation of the several automatic features of the automatic camera while, at the same time, presenting a relatively simple control circuit.

The embodiments of the invention in which an exclusive property or privilege is claimed are defined as follows:

1. In an automatic camera featuring a plurality of automatic control functions including an electronically controlled shutter, an automatic film advance means, an automatic shutter reset means and an electronic flash unit, a control system for controlling the sequence and actuation of said control functions, said control system comprising:

a sequence initiate switch means having a reset condition and an actuated condition, said switch being operable to selectively connect portions of said control system to an energy source means, an oscillator circuit means for energizing said electronic flash unit, said oscillator circuit means being coupled to the energy source means through said reset condition of said sequence initiate switch means;

a first light sensing circuit for sensing the intensity of ambient light, first signal means responsive to said first light sensing circuit for producing a signal having a first signal level when said ambient light is below a predetermined value and a second signal level when said ambient light is above said predetermined value, oscillator control means responsive to said signal from said first signal means, said oscillator control means being operative to enable said oscillator circuit means to be responsive to said first signal level and to block said oscillator circuit means from being responsive to said second signal level, a shutter opening control circuit operative to introduce a momentary delay in the initiation of opening of the shutter, said shutter opening control circuit being coupled to the energy source means through said actuated condition of said sequence initiate switch means, a shutter closing control circuit operative to selectively delay the closure of the shutter, said shutter closing control circuit being coupled to the energy source means through said actuated condition of said sequence initiate switch means, a second light sensing circuit for sensing the amount of light admitted through the opening of the shutter, and second signal means responsive to said second light sensing circuit to produce a control signal representative that a predetermined amount of light had admitted through the shutter opening, said shutter closing control circuit being responsive to said control signal to effect the closure of the shutter.

2. The control circuit as set forth in claim 1 and including a film advancing, shutter cocking drive motor, said motor being coupled in energizing circuit relation with the energy source means through said reset condition of said sequence initiate switch means, and circuit interrupt switch means responsive to the position of a film in said camera for interrupting the motor energizing circuit whenever a film is in proper film frame position in said camera.

3. The control circuit as set forth in claim 1 characterized by the inclusion of trigger means responsive to the signal from said first signal means to effect the triggering of the electronic flash unit when said ambient light is below said predetermined level, and to block the triggering of the electronic flash unit when said ambient light is above said predetermined level.

4. The control circuit as set forth in claim 3 and including means coupling said shutter closing control circuit to said first signal means to effect a closure of said shutter concurrently with the triggering of said flash unit.

5. The control circuit as set forth in claim 4 wherein timed switch means is included between said first signal means and said trigger means as well as between said first signal means and said shutter closing control circuit, said timed switch means being coupled in timed relation to the opening of the shutter and a focus adjustment of the camera lens.

* * * * *